United States Patent
Heckrott et al.

(10) Patent No.: US 9,678,919 B2
(45) Date of Patent: Jun. 13, 2017

(54) COLLISION DETECTION IN EIA-485 BUS SYSTEMS

(71) Applicant: ABB Technology AG, Zürich (CH)

(72) Inventors: Cornelius Heckrott, Zürich (CH); Henrik Pind, Västeras (SE)

(73) Assignee: ABB Schweiz AG, Baden (CH)

( * ) Notice: Subject to any disclaimer, the term of this patent is extended or adjusted under 35 U.S.C. 154(b) by 331 days.

(21) Appl. No.: 14/477,369

(22) Filed: Sep. 4, 2014

(65) Prior Publication Data

US 2014/0372645 A1    Dec. 18, 2014

Related U.S. Application Data

(63) Continuation of application No. PCT/EP2013/054052, filed on Feb. 28, 2013.
(Continued)

(30) Foreign Application Priority Data

Jun. 5, 2012 (EP) .................................. 12170846

(51) Int. Cl.
| | | |
|---|---|---|
| *G06F 13/42* | (2006.01) | |
| *G06F 13/40* | (2006.01) | |
| *H04L 25/02* | (2006.01) | |

(52) U.S. Cl.
CPC ...... *G06F 13/4286* (2013.01); *G06F 13/4072* (2013.01); *H04L 25/028* (2013.01)

(58) Field of Classification Search
CPC . G06F 13/4286; G06F 13/4072; H04L 25/028
(Continued)

(56) References Cited

U.S. PATENT DOCUMENTS

| | | | | |
|---|---|---|---|---|
| 4,941,126 A | * | 7/1990 | Haubursin | ................ H04J 3/10 |
| | | | | 326/56 |
| 5,307,350 A | * | 4/1994 | McIntyre | .............. H04L 12/433 |
| | | | | 370/447 |

(Continued)

FOREIGN PATENT DOCUMENTS

WO    WO 96/20552 A1    7/1996

OTHER PUBLICATIONS

International Preliminary Report on Patentability (Forms PCT/IB/373) and the Written Opinion of the International Searching Authority (Form/PCT/ISA/237) dated Sep. 9, 2014, issued in corresponding International Application No. PCT/EP2013/054052. (6 pgs).

(Continued)

*Primary Examiner* — Paul R Myers
(74) *Attorney, Agent, or Firm* — Taft Stettinius & Hollister LLP

(57) ABSTRACT

A communication module is disclosed for Intelligent Electronic Devices (IEDs) which can implement the EIA-485 standard, including an intelligent hardware support that can allow a known software-based collision detection function to detect collisions independently of the location of the message sources on the transmission line. The hardware support can enable both a "strong signal driving" mode as well as a "weak signal driving" mode. In the weak mode, a biasing, or attenuating, or voltage-dividing resistor can be temporarily inserted between a transmitter, or voltage source, and the transmission line.

15 Claims, 3 Drawing Sheets

Related U.S. Application Data

(60) Provisional application No. 61/606,660, filed on Mar. 5, 2012.

(58) Field of Classification Search
USPC .......................................................... 710/106
See application file for complete search history.

(56) References Cited

U.S. PATENT DOCUMENTS

| | | | |
|---|---|---|---|
| 5,335,226 A * | 8/1994 | Williams | H04L 12/413 370/217 |
| 5,659,543 A * | 8/1997 | Ater | H04Q 3/0062 370/258 |
| 5,687,321 A | 11/1997 | Allen | |
| 5,969,543 A * | 10/1999 | Erickson | H03K 19/018585 326/39 |
| 6,513,383 B1 * | 2/2003 | Okano | B60R 21/013 73/514.34 |
| 6,864,704 B1 * | 3/2005 | Wong | H04L 25/0276 326/26 |
| 7,323,907 B1 * | 1/2008 | Ku | G11C 7/1051 326/22 |
| 2004/0066798 A1 * | 4/2004 | Reuschen | H04L 12/413 370/470 |
| 2008/0002735 A1 | 1/2008 | Poirier et al. | |
| 2009/0067616 A1 | 3/2009 | Suhre | |
| 2011/0161468 A1 * | 6/2011 | Tuckey | H04L 41/0803 709/220 |

OTHER PUBLICATIONS

International Search Report (PCT/ISA/210) mailed on Apr. 4, 2013, by the European Patent Office as the International Searching Authority for International Application No. PCT/EP2013/054052.
Search Report mailed on Nov. 9, 2012, by the European Patent Office for Application No. 12170846.5.

* cited by examiner

COLLISION DETECTION IN EIA-485 BUS SYSTEMS

RELATED APPLICATION(S)

This application claims priority as a continuation application under 35 U.S.C. §120 to PCT/EP2013/054052, which was filed as an International Application on Feb. 28, 2013, designating the U.S., and which claims priority to U.S. Provisional Patent Application No. 61/606,660 filed in the United States on Mar. 5, 2012, and European Application No. 12170846.5 filed in Europe on Jun. 5, 2012. The entire contents of these applications are hereby incorporated by reference in their entireties.

FIELD

The disclosure relates to the field of data communication over bus systems according to RS-485, and for example, to message collision detection in such systems.

BACKGROUND INFORMATION

The EIA-485 (also referred to as RS-485) standard defines a balanced multi-drop communication, which can be used by different types of serial communication protocols. EIA-485 is concerned with the electrical characteristics of the interface and does not specify a protocol, nor does it refer to a specific connector or collision detection or collision avoidance technique. A bus system according to EIA-485 can include up to 32 (unit load) devices and the length of the bus can be up to 1200 meters with Baud rates of 115200 bits/s or higher. Although EIA-485 is specified as Half Duplex (HD) transmission, the communication can become Full Duplex (FD) by applying a four wire connection.

Colliding messages can reduce the data throughput on communication links. For example, at least two messages can be lost in a collision. In addition, most protocols have re-transmission techniques in place, which can lead to further collisions. Accordingly, collisions should be avoided using suitable collision avoidance techniques such as Carrier Sense Multiple Access (CSMA) with Collision Avoidance. However, even with a collision avoidance measure, collisions can still occur and should be properly detected.

Within Substation Automation Systems, a protocol which can be used via, or over, EIA-485 is DNP 3.0, which can allow slaves transmitting messages in an uncoordinated manner (called "DNP unsolicited mode"). In this case, it is imperative to recognize collisions, as any data rate degradation on the bus is not acceptable, for example, if high priority event messages need to be sent.

FIG. 1 depicts a known HD setup with an EIA-485 transceiver connected to a bus including positive wire A and negative wire B. In order to relatively ensure a fail-safe EIA-485 communication, permanent pull-up and pull-down resistors $R_A$, $R_B$ can be provided respectively between wire A and Vcc (e.g. 3.3 or 5 Volts) and between wire B and GND (ground), in order to bias the data lines into a defined state. A termination resistor $R_T$ can be used at the bus ends to help avoid reflections caused by high Baud rates and fast slew rates.

FIG. 2 depicts a known timing diagram for the transceiver wiring of FIG. 1, with '1' being called 'mark' and '0' being called 'space'. As long as there is no traffic on the line (idle state), the line is transmitting marks or '1' continuously. The start bit is '0' (space) and the stop bit again is '1' (mark). Therefore, there will be a transition from mark to space at the start of every word. This way the receiver can synchronise its clock regardless of the data content.

Many EIA-485 implementations can include a software-based collision detection principle where the transmit data TX_D, which was provided, for example, by a Universal Asynchronous Receiver/Transmitter (UART), can be compared against receive data RX_D recorded by the receiver during transmission of the transmit data TX_D. If the data does not correlate, an occurrence of a collision can be signalled. However, such a solution can be only suitable if the colliding signal superposes the transmit signal sufficiently. In an EIA-485 setup with a long transmission line exceeding a few hundred meters, and/or with a cable of bad quality, one transmitter can appear stronger than the other transmitter. Thus, a collision can remain undetected in case two transmitters are located at far ends of the bus.

FIG. 3 depicts an exemplary set-up of an EIA-485 bus system with a bus length of 1000 m and including two neighboring IEDs 1 and 2 as well as remote IED 32.

FIG. 4 shows the result of a transmission over the bus system of FIG. 3, wherein IED 1 is receiving, while IED 2 and IED 32 are both transmitting. The four signals displayed can include, from top to bottom, the transmitted signal from IED 2 (TX2_D), the signal transmitted from the remote IED 32 (TX32_D), a resulting superposition signal on the bus in the vicinity of IED 1 and IED 2 (Vbus), and the received signal at the RS-485 receiver inside IED 1 as obtained from Vbus by discrimination (RX1_D). As apparent from RX1_D, TX32_D is not strong enough to significantly influence Vbus. In other words, TX2_D can dominate and mask the collision with the messages from remote IED 32.

For example, it can be noted that the EIA-485 transceivers in IED 2 and IED 32 drive their signals with the same strength. The impedance of the transmission line, however, can reduce the signal energy from IED 32 as the signal travels from one bus end to the other. When arriving at IED 1 and IED 2, the signal may not be strong enough to superimpose the local signal.

SUMMARY

A method of facilitating message collision detection in a communication bus system operating according to EIA-485 is disclosed, wherein a signal transmitter is connected to a transmission line for transmitting a binary signal including a first bit followed by a second bit, the method comprising: applying a first voltage indicative of the first bit to the transmission line; applying, during a transitional period shorter than a duration of the second bit, a second voltage indicative of the second bit to the transmission line; applying, during a weak driving period following the transitional period, a third voltage indicative of the second bit to the transmission line via a biasing resistor; and detecting a superposition of the third voltage with a signal from an interfering message source connected to the transmission line, by a receiver connected to the transmission line.

A communication module for an IED in a communication bus system operating according to EIA-485 is disclosed, comprising: a signal transmitter connectable to a transmission line for transmitting a binary signal including a first bit followed by a second bit, wherein the signal transmitter is configured to apply to the transmission line: a first voltage indicative of the first bit; during a transitional period shorter than a duration of the second bit, a second voltage indicative of the second bit; and during a weak driving period following the transitional period and via a biasing resistor, a third voltage indicative of the second bit.

A Substation Automation (SA) system is disclosed, comprising: a plurality of Intelligent Electronic Devices (IEDs) connecting to a Station Bus and communicating according to DNP 3.0 via EIA-485, wherein each of the plurality of IEDs includes a communication module having a signal transmitter connectable to a transmission line for transmitting a binary signal including a first bit followed by a second bit, wherein the signal transmitter is configured to apply to the transmission line: a first voltage indicative of the first bit; during a transitional period shorter than a duration of the second bit, a second voltage indicative of the second bit; and during a weak driving period following the transitional period and via a biasing resistor, a third voltage indicative of the second bit.

BRIEF DESCRIPTION OF THE DISCLOSURE

The subject matter of the disclosure will be explained in more detail in the following text with reference to exemplary embodiments, which are illustrated in the attached drawings, in which:

FIG. 1 schematically shows a known EIA-485 HD setup;

Figure 3:
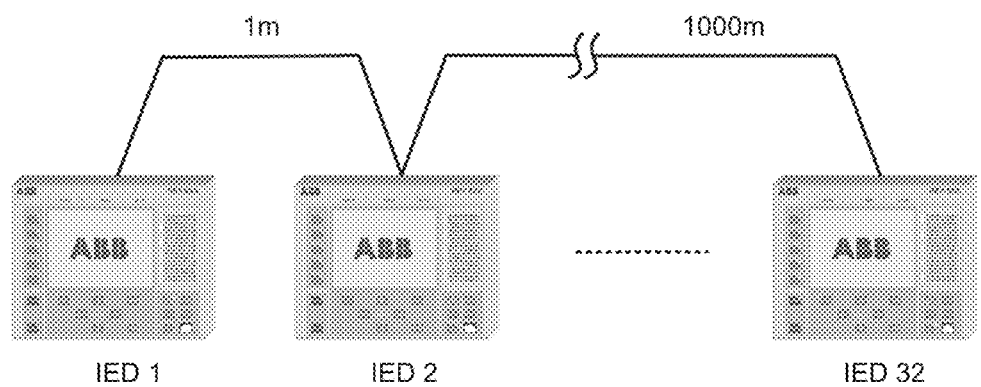
FIG. 3 depicts a known EIA-485 bus system with up to 32 IEDs.
Figure 4:
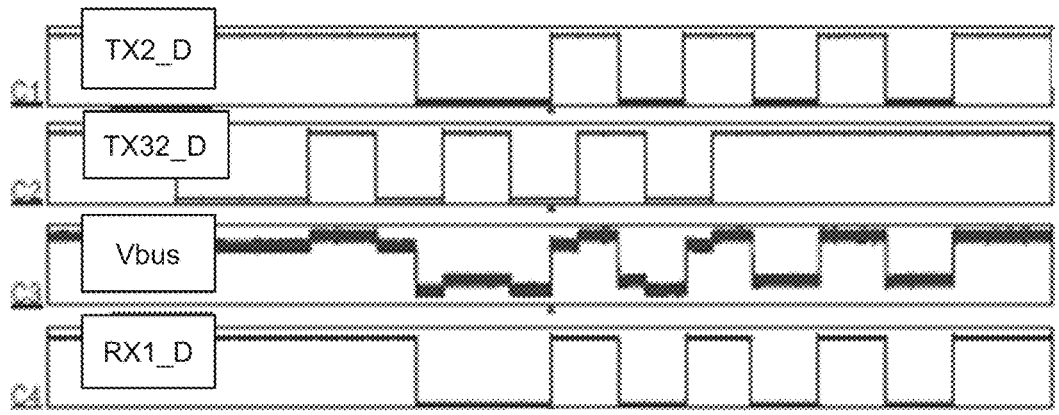
Figure 5:
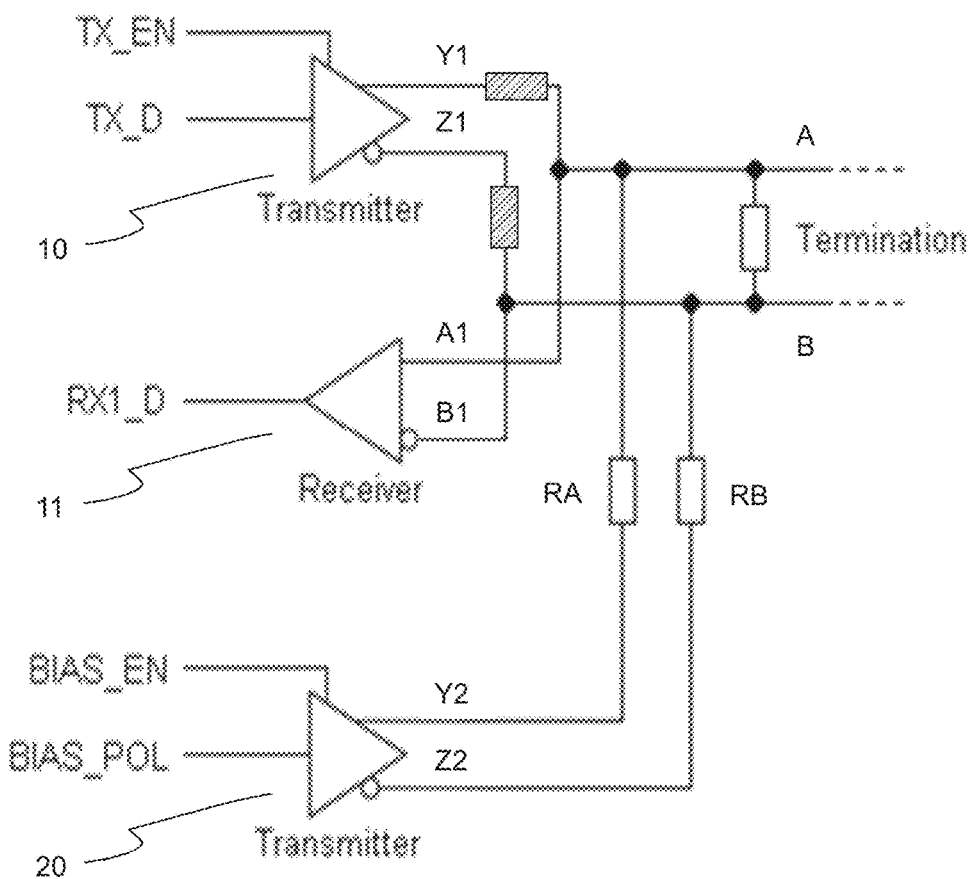
Figure 6:
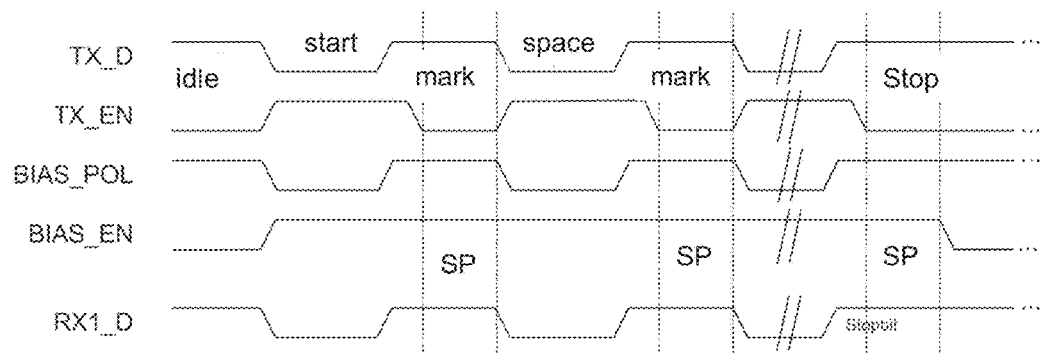

FIG. 4 traces four signals resulting from a transmission on the bus system of FIG. 3;

FIG. 5 schematically shows an exemplary EIA-485 implementation with two RS-485 line drivers;

FIG. 6 is an exemplary timing diagram for the transceiver wiring in FIG. 5; and

Figure 7:
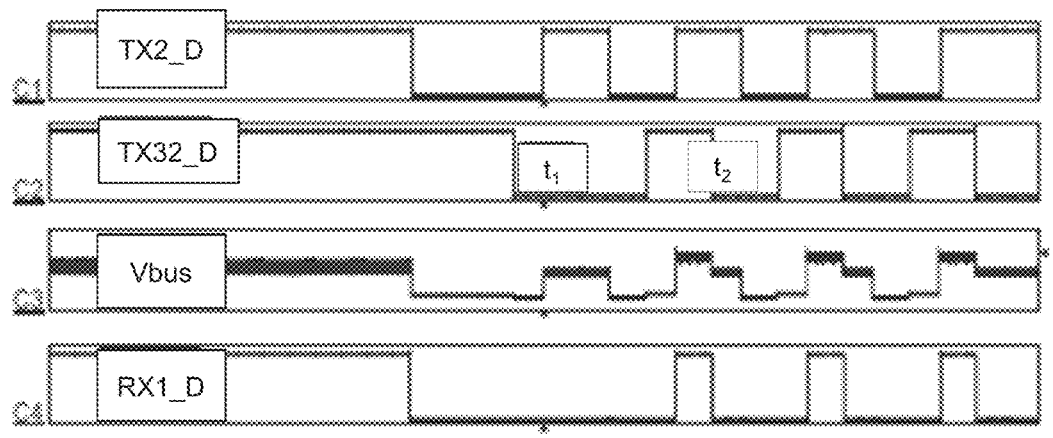

FIG. 7 traces four signals resulting from a transmission according to an exemplary embodiment of the disclosure.

DETAILED DESCRIPTION

In accordance with an exemplary embodiment, a method and communication module are disclosed, which can facilitate message collision detection in communication bus systems operating according to EIA-485, for example in Substation Automation systems with extended communication bus topologies including transmission line distances between two message sources in excess of a few hundred meters.

According to an exemplary embodiment of the disclosure, a communication module for Intelligent Electronic Devices (IEDs) implementing the EIA-485 standard can be provided with an intelligent hardware support that allows a conventional software-based collision detection function to detect collisions independently of the location of the message sources on the transmission line. The hardware support can enable both a "strong signal driving" mode (i.e., "strong mode") as well as a "weak signal driving" mode (i.e., a "weak mode" relative to the drive of the strong mode). In the weak mode, an EIA-485 biasing, or attenuating, or voltage-dividing resistor can be temporarily inserted between a transmitter, or voltage source, and the transmission line.

By way of example, active bits such as any start bit and any 'space' or '0' data bit are transmitted in a strong mode. During a transitional period, at the beginning of each "mark" or '1' data bit, the strong mode is likewise enabled, after which the transmission mode can change to the weak mode by activating the biasing resistor, which can detect a collision provoked by another transmitter. In accordance with an exemplary embodiment, the disclosed collision detection facilitation technique can be used in conjunction with a suitable collision avoidance mechanism such as CSMA.

For example, in accordance with an exemplary embodiment, message collision detection in communication bus systems operating according to EIA-485, wherein a signal transmitter is connected to two wires of a transmission line for transmitting a binary signal including a first bit ("space") followed by a second bit ("mark") different from the first bit, can include the steps of: applying, or providing, to the transmission line, for a period of time corresponding to a duration of the first bit, a first voltage indicative of, or coding, the first bit; applying to the transmission line, during a transitional period shorter than a duration of the second bit, a second voltage indicative of the second bit; applying to the transmission line, following the transitional period and, for example, for the rest of the duration of the second bit, a third voltage likewise indicative of the second bit, wherein the third voltage can be equal to the second voltage, and wherein a biasing, or attenuating, or voltage-dividing resistor can be provided between a transmitter or voltage source providing the third voltage and the transmission line (e.g., to create a weak driving period of a weak mode), and detecting a superposition of the third voltage with a signal from a remote interfering message source by a receiver connected to the transmission line, for example, at a location of the communication bus system between the biasing resistor and the remote message source.

In an exemplary embodiment of the disclosure, the third voltage can be applied to the transmission line by a weak-mode transmitter different from the transmitter applying the second voltage. The biasing resistors can be permanently arranged between the weak-mode transmitter and the transmission line, and thus does not need to be switched or otherwise activated/deactivated.

In an exemplary embodiment of the disclosure, the second voltage can have a reverse polarity, or an opposite sign, of the first voltage and the duration of the transitional period can be sufficient to reverse the polarity of the transmission line over the entire length of the line. For example, the transitional period can be generally shorter than five microseconds, for example shorter than 2 microseconds, and for example, equal to about one microsecond.

Figure 1:
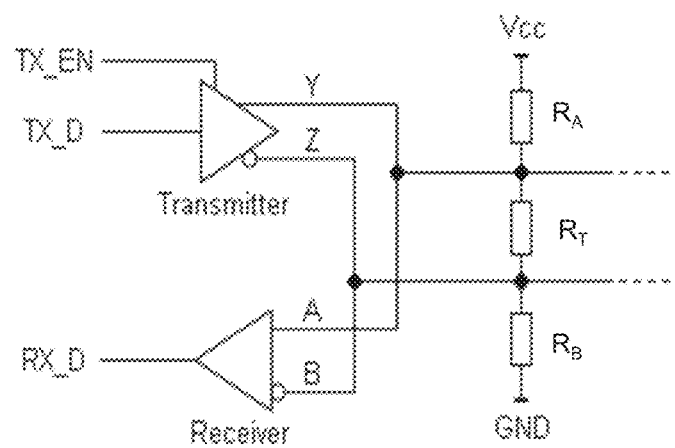
Figure 2:
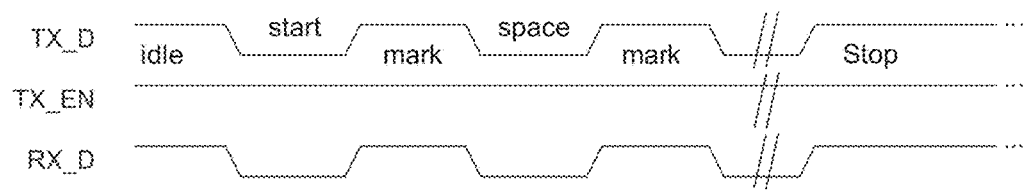
FIG. 2 is a timing diagram for the transceiver wiring in FIG. 1.

FIG. 5 depicts an exemplary EIA-485 HD setup according to the disclosure. In accordance with an exemplary embodiment, two identical transmitters or line drivers can be used in this configuration. Primary transmitter 10 remains unchanged with respect to the configuration of FIG. 1, with output Y1 of primary transmitter 10 being connected to wire A of the transmission line, and output Z1 being connected to wire B. Receiver 11 can have a first input A1 connected to wire A and a second input B1 connected to wire B. Biasing transmitter 20 can be connected to the transmission line in parallel to the primary transmitter 10 and via biasing resistors RA, RB. For example, output Y2 of biasing transmitter 20 can be connected via first biasing resistor RA to wire A of the transmission line, while output Z2 can be connected via biasing resistor RB to wire B. Data signals TX_D and BIAS_POL can be input to the two RS-485 transmitters 10, 20, wherein the transmit data stream TX_D of the primary transmitter, for example, can be used as an input for the biasing transmitter BIAS_POL as well. The two line drivers can be connected to a dedicated Programmable Gate Array (FPGA or CPLD, not shown) providing the control signals TX_EN and BIAS_EN.

In accordance with an exemplary embodiment, operation of the biasing resistors RA, RB can be controlled by the transmitters to drive the transmission line in a "weak mode"

during selected "sensitive" or "vulnerable" periods. Weak driving can include applying the driving voltage of the transmitter in series to the biasing resistors and to the transmission line. Accordingly, a voltage drop at the biasing resistors can, for example, be comparable in magnitude to a voltage drop suffered by an unbiased driving voltage applied at a remote end of the transmission line. A receiver connected to the transmission line between the biasing resistors and the remote transmitter will thus be able to detect a derivation or derogation of the transmitted signal due to superposition by a colliding signal. Thus, a colliding signal can be detected at the sending device and a collision can be signalled.

The shaded rectangles in FIG. 5 denote alternative locations for the biasing resistors in a single-transceiver variant without a dedicated biasing transmitter 20. In accordance with an exemplary embodiment, the biasing resistors can be inserted between the outputs Y1 and Z1 of the first transmitter and the respective bifurcation point (T-point) on the wire A, B connecting to receiver inputs. In accordance with an exemplary embodiment, biasing resistors inserted in such alternative locations need to be bypassed or otherwise deactivated in strong driving mode.

FIG. 6 depicts an exemplary timing diagram for the transceiver wiring shown in FIG. 5. For example, the transmit enable pin TX_EN of the primary line driver is active just as long as it is needed for transmitting the "space" and for shifting the voltage level, or polarity, from "space" to "mark". Once the voltage level corresponding to "mark" has been established throughout the entire bus, which can be the case after a few microseconds, the primary transmitter 10 can be disabled. For the remaining duration of the "mark" interval, the permanently enabled biasing transmitter 20 can weakly drive the transmitted signal. For example, the RX1_D signal only reduces insignificantly when passing from strong to weak driving mode.

The biasing enable pin BIAS_EN of the biasing driver can be active from the start bit until some pre-set time after the last character has left the UART ("Byte enable"). In accordance with an exemplary embodiment, the bias support should be disabled shortly after the message was sent in order not to overload the bus with multiple "bias supporters".

The selection of the biasing resistor values can depend on the type of transmission line, for example, the cable characteristic impedance. Accordingly, the value chosen is allowed to derogate or vary from the standard 120 Ohm, for example, between 100 to 150 Ohm.

FIG. 7 shows the result of a modified transmission over the bus system of FIG. 3, with IED 2 and IED 32 both transmitting. The four signals depicted include, from top to bottom, the signals transmitted from IED 2 (TX2_D) and from remote IED 32 (TX32_D), a resulting superimposed signal on the bus at or close to IED 2 (Vbus), as well as, derived from the former, the receive signal (RX2_D) determined by the receiver inside IED 2. Due to the biasing resistors of IED 2, the signal transmitted from remote IED 32 has a noticeable influence at IED 2. For example, at time t2 indicating the end of the first "mark" transmitted by IED 32, and approximately coinciding with the middle of the second "mark" transmitted by IED 2, the superposition signal Vbus drops remarkably, and the discriminated receive signal returns to low. Accordingly, the IED 2 can determine a discrepancy between a transmit signal and a receive signal, and conclude that a collision has occurred.

In accordance with an exemplary embodiment, it can be noted that the time scale corresponds to a bit length of a few milliseconds and a Baud rate of 300. For this reason, the initial strong driving part lasting for a few microseconds can lead only to a narrow spike in the superposition signal and the receive signal at t1.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of facilitating message collision detection in a communication bus system operating according to EIA-485, wherein a signal transmitter is connected to a transmission line for transmitting a binary signal including a first bit followed by a second bit, the method comprising:
   applying a first voltage indicative of the first bit to the transmission line;
   applying, during a transitional period shorter than a duration of the second bit, a second voltage indicative of the second bit to the transmission line;
   applying, during a weak driving period following the transitional period, a third voltage indicative of the second bit to the transmission line via a biasing resistor; and
   detecting a superposition of the third voltage with a signal from an interfering message source connected to the transmission line, by a receiver connected to the transmission line.

2. The method according to claim 1, comprising:
   applying during the transitional period, the second voltage to the transmission line by a first transmitter;
   disabling the first transmitter after the transitional period; and
   applying the third voltage by a second transmitter.

3. The method according to claim 1, wherein the transitional period is shorter than five microseconds.

4. The method according to claim 1, wherein the transitional period is shorter than two microseconds.

5. A communication module for an IED in a communication bus system operating according to EIA-485, comprising:
   a signal transmitter connectable to a transmission line for transmitting a binary signal including a first bit followed by a second bit, wherein the signal transmitter is configured to apply to the transmission line:
   a first voltage indicative of the first bit;
   during a transitional period shorter than a duration of the second bit, a second voltage indicative of the second bit; and
   during a weak driving period following the transitional period and via a biasing resistor, a third voltage indicative of the second bit.

6. The communication module according to claim 5, comprising
   a first transmitter for applying the second voltage to the transmission line during the transitional period; and
   a second transmitter for applying the third voltage to the transmission line.

7. The communication module according to claim 5, wherein the signal transmitter is configured to provide a transitional period which is shorter than five microseconds.

8. The communication module according to claim 5, wherein the signal transmitter is configured to provide a transitional period which is shorter than two microseconds.

9. The communication module according to claim 5, in combination with a transmission line.

10. The communication module according to claim 6, wherein the signal transmitter is configured to provide a transitional period which is shorter than two microseconds.

11. The communication module according to claim 10, in combination with a transmission line.

12. A Substation Automation (SA) system, comprising:

a plurality of Intelligent Electronic Devices (IEDs) connecting to a Station Bus and communicating according to DNP 3.0 via EIA-485, wherein each of the plurality of IEDs includes a communication module having a signal transmitter connectable to a transmission line for transmitting a binary signal including a first bit followed by a second bit, wherein the signal transmitter is configured to apply to the transmission line:

a first voltage indicative of the first bit;

during a transitional period shorter than a duration of the second bit, a second voltage indicative of the second bit; and during a weak driving period following the transitional period and via a biasing resistor, a third voltage indicative of the second bit.

13. The system according to claim 12, wherein the signal transmitter for each of the plurality of IEDs comprises:

a first transmitter for applying the second voltage to the transmission line during the transitional period; and a second transmitter for applying the third voltage to the transmission line.

14. The system according to claim 12, wherein the transitional period is shorter than five microseconds.

15. The system according to claim 12, wherein the transitional period is shorter than two microseconds.

* * * * *